United States Patent

[11] 3,616,457

| [72] | Inventors | Wilhelm Einar Stellan Hjerten;<br>Nils Ivar Leonard Sture Jerstedt; Arne<br>Wilhelm Kaurin Tiselius, all of Uppsala,<br>Sweden |
|---|---|---|
| [21] | Appl. No. | 859,406 |
| [22] | Filed | Sept. 19, 1969 |
| [45] | Patented | Oct. 26, 1971 |
| [73] | Assignee | LKB-Produkter AB<br>Mariehall, Sweden |
| [32] | Priority | Sept. 19, 1968 |
| [33] | | Sweden |
| [31] | | 12,620/68 |

[54] APPARATUS FOR CARRYING OUT GEL ELECTROLYSIS
5 Claims, 6 Drawing Figs.

| [52] | U.S. Cl. | 204/299,<br>204/180 G |
|---|---|---|
| [51] | Int. Cl. | B01k 5/00 |
| [50] | Field of Search | 204/299,<br>180 G |

[56] References Cited
UNITED STATES PATENTS

| 3,129,158 | 4/1964 | Raymond et al. | 204/180 G |
|---|---|---|---|
| 3,208,929 | 9/1965 | Raymond et al. | 204/299 |
| 3,255,100 | 6/1966 | Raymond | 204/180 G |
| 3,290,240 | 12/1966 | Neren | 204/299 |
| 3,346,479 | 10/1967 | Natelson | 204/301 |
| 3,374,166 | 3/1968 | Raymond | 204/299 |
| 3,453,200 | 7/1969 | Allington | 204/301 |

*Primary Examiner*—John H. Mack
*Assistant Examiner*—A. C. Prescott
*Attorney*—Christen & Sabol

ABSTRACT: An apparatus for preparative gel electrophoresis comprising a parallelepipedal separation chamber in which cooling surfaces are provided close to one another along two opposite sides of the parallelepiped, these surfaces being shaped so that the gel is mechanically prevented from sliding and so that good cooling is obtained when the gel is cast into the separation chamber and thereafter hardened. This apparatus also comprises normal facilities as elution chamber below the separation chamber and electrodes at both the top and bottom of the separation chamber.

PATENTED OCT 26 1971                                      3,616,457
FIG.1
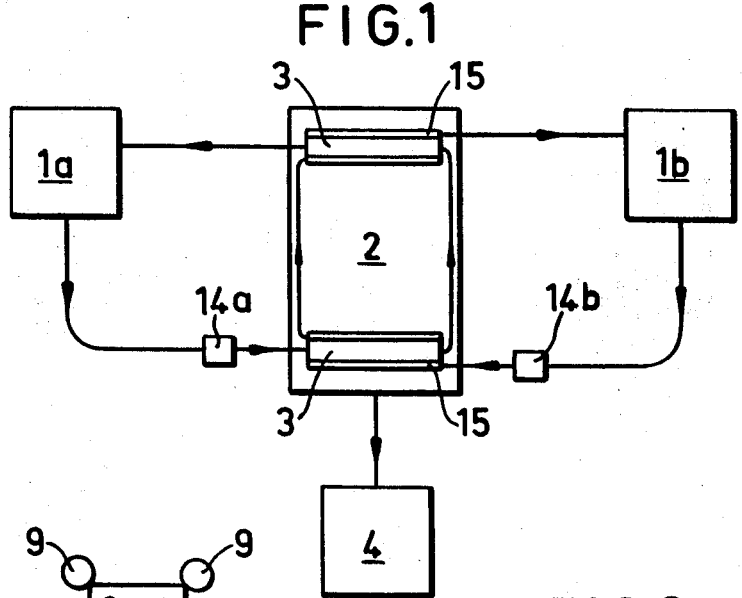
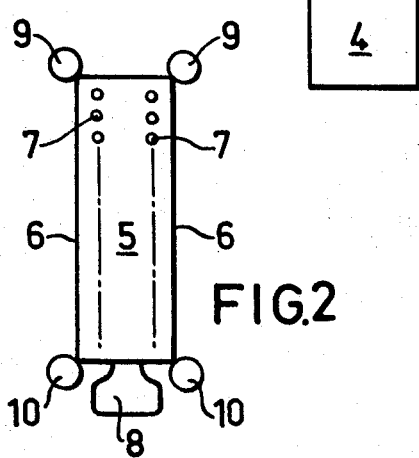
FIG.2
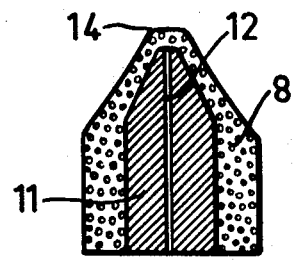
FIG.6
FIG.3  FIG.4  FIG.5
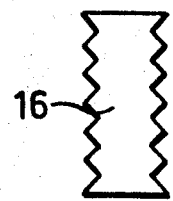
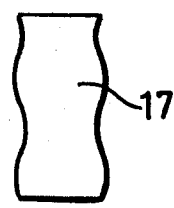
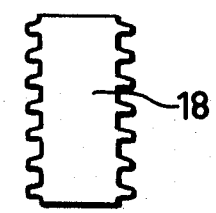

APPARATUS FOR CARRYING OUT GEL ELECTROLYSIS

BACKGROUND OF THE INVENTION:

This invention relates to electrophoresis, specifically to an apparatus for carrying out gel electrophoresis.

A plurality of devices for carrying out gel electrophoresis are known. These devices are intended for electrophoresis on an analytical scale. One has tried to make these electrophoresis devices bigger in order to carry out electrophoresis on a preparative scale. However, so far one has not been successful for quantities of substance up to about 1 gms.

When designing an apparatus for preparative gel electrophoresis one must pay particular attention to the problem of recovering the zones. The ideal recovery process should not cause: (1) any mixing of zones that are separated in the gel, (2) losses of material, (3) dilution of zones, or (4) denaturation.

We have explored several possible means of satisfying these requirements. In our earliest experiments we allowed the substances to migrate out of the gel slab in a direction perpendicular to that used for the electrophoretic separation. However, large losses of material were incurred, particularly with substances that were present in low concentrations and which were therefore more susceptible to dissipation by thermal convection upon emerging from the gel. Accordingly, trace components, and substances that float, e.g., lipoproteins, cannot be recovered in good yield by this or any other procedure, that depends primarily upon gravitational convection. This elution technique has been utilized by Raymond (U.S. specification 3,255,100); protein recoveries of 59–89 percent have been reported.

We have now found that gel electrophoresis can be carried out on a gram scale avoiding the disadvantages of the prior art and obtaining gels being of the order of 100 percent, i.e. the same as with analytical runs. The apparatus according to our invention comprises a separation chamber, an elution chamber located under the separation chamber and in connection therewith as well as one or several electrodes arranged at the upper part of the separation chamber in connection therewith and one or several electrodes arranged at the lower part of the separation chamber in connection with the elution chamber. The new features of this apparatus consists in the fact that the separation chamber has the form of a parallelepiped, wherein cooling surfaces are adapted near to each other along two opposite sides of the parallelepiped and designed in such a way, for instance corrugated, waved, that at casting of gel in the separation chamber this gel is mechanically prevented from sliding after solidification.

In a suitable embodiment the cooling surfaces consist of cooling tubes, which are adapted along the sides of the parallelepiped and preferably horizontally. The cooling tubes on each side of the parallelepiped are preferably fed separately with cooling liquid. In a suitable embodiment the elution chamber is provided with an insert, wherein there are cannulae, through which elution agent is withdrawn together with eluted material.

In carrying out electrophoresis a gel is first cast in the separation chamber and the elution chamber is filled in suitable manner. The material to be treated electrophoretically is then inserted at the top in a groove in the gel and a DC current field is adapted vertically through the gel, after which the materials are passed through a narrow layer of this gel between cooling surfaces under the separation of the components of the material and under the influence of the DC current field. The separated components coming out at the lower end of the gel layer are continuously eluted and separately collected. The elution chamber is preferably filled with granules.

BRIEF DESCRIPTION OF THE DRAWING

The invention will be more closely described below with reference to the enclosed drawing, in which FIG. 1 schematically shows a device according to the invention. FIG. 2 shows schematically and in section a more detailed picture of a separation chamber and adjacent means in an apparatus according to the invention. FIGS. 3–5 show different embodiments of cooling surfaces in a separation chamber according to the invention. Finally FIG. 6 shows an elution chamber in section according to the invention.

DESCRIPTION OF THE PREFERRED EMBODIMENTS

In FIG. 1 vessels $1a$ and $1b$ for buffer agent are shown, which is led to the electrophoresis apparatus itself by means of pumps $14a$ and $14b$. In this electrophoresis apparatus 2 only dialysis bags 3 for electrodes and a casing are schematically shown, which casing encloses these dialysis bags. From the pump $14a$ the buffer agent is carried through the lower dialysis bag 3 and then through the upper dialysis bag 3 back to the container $1a$ for the buffer agent. From the pump $14b$ the buffer agent is led to the space 15 between the inner dialysis bag 3 and the outer casing in the lower electrode and then to the same space 15 in the upper electrode and back to the container $1b$ for the buffer agent. Elution liquid withdrawn from the electrophoresis apparatus 2 is collected in a fraction collector 4.

The separation chamber itself is illustrated more in detail in FIG. 2. This figure shows a suitable embodiment and comprises a separation chamber 5 with vertical sides 6, on the inside of which cooling tubes 7 are adapted, which are here shown horizontal. Under the separation chamber there is an elution chamber 8 and at the top there are holders with electrodes 9 and at the bottom holders with electrodes 10.

Instead of cooling tubes it is also possible to form the walls of the separation chamber as cooling surfaces, which prevent at the same time gel cast in the separation chamber from sliding. In other words the gel will be stabilized. According to FIG. 3 this has been achieved by the cooling surfaces 16 in the section being saw-toothed. According to FIG. 4 the cooling surfaces 17 are waved and according to FIG. 5 the cooling surfaces 18 are made with deep cuts.

These figures only show examples of cooling surfaces, and it is quite clear to a man of the art, which mechanical embodiments are possible to prevent sliding. In use gel is cast between the cooling surfaces and cooling agent is passed along the other side of the cooling surfaces. This side can of course also be divided into sections, but the most suitable embodiment is that shown in FIG. 2, wherein the cooling surfaces consist of cooling tubes. The distance between the cooling surfaces should be as little as is practically possible, i.e. one or a few centimeters. This depends above all on the fact that the gel is to be effectively cooled during the electrophoresis. Thus, the heat formed by the passage of current must be carried away through the cooling surfaces. If too little cooling is obtained, the gel is heated and this above all furthest away from the cooling surfaces, i.e. about the median plane of the cooling surfaces, at completely uniform cooling exactly on the median plane between the cooling surfaces. This heating results in the fact that the material transported most centrally obtains a greater transport velocity than the material transported nearer to the cooling surfaces. In this way the separation ability is deteriorated to a large degree.

As has appeared it is also essential that cooling is effected uniformly on both of the cooled sides of the separation chamber. At nonuniform cooling the greatest transport velocity is achieved at the most poorly cooled surface. Also in this case an inferior separation is obtained.

In FIG. 6 a view of an elution chamber is shown in detail, which is preferably used in an apparatus according to the invention. The elution chamber itself is designated by 8 and is filled with granulate. In this suitable embodiment of the invention there is an insert 11 in the elution chamber 8. In this insert 11 there is a number of bores or notches 12, which are connected with the elution chamber 8 at its upper part 14. This upper part 14 is in operation very near to the gel in the separation chamber 5 or in contact with same. A suitable distance between the notches 12 in the longitudinal direction of the elution chamber can be about 5 centimeters. By this arrangement with a bore 12 a uniform current of elution liquid will pass the gel layer in the separation chamber 5, elute the material transported therein and carry away this to a fraction collector 4. The distance should be determined so that an even elution is achieved. This can be easily effected according to the method, by which the elution is carried out.

In the suitable embodiment of the invention shown in FIG. 2 an electrode chamber with an electrode 10 is located on both sides of the elution chamber 8 and two electrode chambers with electrodes 9 are likewise placed at the top. Of course, it is not necessary that two electrodes are disposed on both these places, but this promotes that the transport is made centrally. As it is difficult from considerations of space to adapt one single electrode centrally at the top and at the bottom, this device has turned out to be most suitable, even if it is of course possible to use more than two electrodes both at the top and at the bottom.

The present apparatus is prepared for operation by filling the separation chamber 5 with gel-forming solution. In this way the elution chamber 8 is closed with a mold and a mold is inserted into the upper part of the separation chamber intended for bringing about the formation of a hollow, a ditch, in the upper part of the gel after casting and solidification of the gel. At casting of the gel, which preferably consists of a polyacryloamide gel, deaerated monomer solution is filled into the separation chamber 5, air admixture being avoided. It is also suitable that the separation chamber before casting of the gel is filled with an inert gas, preferably argon, so that the monomer solution will not get in contact with air. If air bubbles in spite of all precautionary measures should form on the cooling surfaces, for instance the cooling tubes 7, they must be removed before the solidification of the gel. This can be effected by tilting or rapping the apparatus. During casting and solidification of the gel-cooling agent should pass in intended manner through the apparatus, for instance through the cooling tubes 7, and this flow of cooling agent should then go on until the electrophoresis has been quite carried out. After the polymerization has been completed, the mold is removed from the groove formed, and the mold is also taken away from the elution chamber 8.

The arrangement with the cast gel, which is now so stable that the apparatus can be placed on its side, is closed against the elution chamber 8 by means of a lid. Before this lid is applied and the apparatus is placed on its side, the gel in the separation chamber 5 has however been additionally stabilized as a lid has been placed on the upper part of the separation chamber after filling of buffer agent. The lid sealing the elution chamber 8 preferably consists of a lid with inserts as described with reference to FIG. 6, after which buffer agent is poured into the elution chamber to some height and gel spheres are cautiously inserted. These gel spheres preferably consist of an agarose gel, for instance agarose gel of 4 percent, such as those sold with the name Sepharose 4B by Pharmacia Fine Chemicals. It is important that the gel spheres are in close contact with the gel layer in the separation chamber, a porous polyethylene sheet however being adapted on top of the insert.

For electrophoresis the material to be treated is added in the groove, the ditch, in the upper part of the gel, the amount of buffer agent present during filling of the elution chamber first being withdrawn. At preparative electrophoresis the material is applied in the whole length of the ditch. It is however also possible to place the material in patches in the ditch, the patches being spaced from each other and preferably straight above each of their cannula in the insert in the elution chamber 8. In the latter way it is possible to use the present apparatus for fractionating of smaller amounts of substance. After supply of the material to the ditch, voltage is applied to the electrodes, which are inserted in dialysis bags, on whose inside as well as outside buffer agent is circulating. The electrical contact with the gel and the material in the separation chamber 5 is brought about by openings in the electrode chamber, which openings are also covered by porous plastic, preferably porous polyethylene discs, through which buffer agent is slowly flowing. The buffer agent from the lower electrode chambers flows upwards towards the lower surface of the gel layer and into the bores 12 carrying eluted material that has passed through the gel.

According to the present invention the following advantages are obtained: Only the central part of the gel is used for the electrophoresis, very good cooling of the gel is obtained during the whole electrophoresis, the gel is stabilized mechanically through the cooling surfaces.

What we claim is:

1. In an apparatus for carrying out gel electrophoresis on a gram scale, comprising a separation chamber, an elution chamber located under the separation chamber and connected to same as well as at least one electrode adapted at the upper part of the separation chamber in connection with same and at least one electrode adapted at the lower part of the separation chamber in connection with the elution chamber, the improvement that the separation chamber (5) has the form of a parallelepiped, wherein cooling surfaces (7,16,17,18) are adapted near to each other along two opposite sides of the parallelpiped, said surfaces not being flat planes, but rather being shaped in such a way, that at casting of gel in the separation chamber (5) this gel after solidification is mechanically prevented from sliding and so that good cooling is obtained.

2. The apparatus as claimed in claim 1, wherein the cooling surfaces consist of cooling tubes (7) adapted along the sides.

3. The apparatus as claimed in claim 2, wherein the cooling tubes (7) are adapted to be separately fed with cooling liquid on each side.

4. The apparatus as claimed in claim 2, wherein the cooling tubes are arranged horizontally.

5. The apparatus as claimed in claim 3 wherein the cooling tubes are arranged horizontally.

* * * * *